(12) United States Patent
Miyata et al.

(10) Patent No.: US 8,105,712 B2
(45) Date of Patent: Jan. 31, 2012

(54) SEALED SECONDARY BATTERY, AND METHOD FOR MANUFACTURING THE BATTERY

(75) Inventors: Kyosuke Miyata, Osaka (JP); Takahiro Fukuoka, Osaka (JP); Yukio Harima, Osaka (JP); Koji Funami, Kyoto (JP); Seiji Kumazawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/739,830

(22) PCT Filed: Jun. 23, 2009

(86) PCT No.: PCT/JP2009/002854
§ 371 (c)(1),
(2), (4) Date: Apr. 26, 2010

(87) PCT Pub. No.: WO2010/016182
PCT Pub. Date: Feb. 11, 2010

(65) Prior Publication Data
US 2010/0247992 A1    Sep. 30, 2010

(30) Foreign Application Priority Data

Aug. 8, 2008 (JP) ................. 2008-205418
Aug. 18, 2008 (JP) ................. 2008-209836
Aug. 18, 2008 (JP) ................. 2008-209838
Oct. 27, 2008 (JP) ................. 2008-275166

(51) Int. Cl.
*H01M 10/00* (2006.01)
*H01M 4/04* (2006.01)
*H01M 2/22* (2006.01)
*B23K 26/00* (2006.01)

(52) U.S. Cl. ........ 429/185; 429/161; 429/163; 429/178; 29/623.1; 219/121.64

(58) Field of Classification Search ............. 429/94, 429/129, 181, 163, 178, 185; 29/623.1, 623.2, 29/623.4; 219/121.84, 121.64
See application file for complete search history.

(56) References Cited

U.S. PATENT DOCUMENTS

2002/0017513 A1 * 2/2002 Nagura et al. ........... 219/121.84
(Continued)

FOREIGN PATENT DOCUMENTS

JP          10-249561          9/1998
(Continued)

OTHER PUBLICATIONS

Full Machine Translation of: JP 2005/005215, Matsui et al., Jan. 6, 2005.*

(Continued)

*Primary Examiner* — Jonathan Crepeau
*Assistant Examiner* — Kenneth Douyette
(74) *Attorney, Agent, or Firm* — McDermott Will & Emery LLP

(57) ABSTRACT

An electrode group 4 formed by stacking or winding a positive electrode plate 1 and a negative electrode plate 2 with a separator 3 interposed therebetween, is housed in a battery case 5. An opening of the battery case 5 is sealed with a sealing plate 10. A lead 11 extending from one of the positive and negative electrode plates in the electrode group 4 is laser-welded to the sealing plate 10 by application of a laser beam 12 having a spot diameter smaller than a thickness of the lead 11.

20 Claims, 15 Drawing Sheets

U.S. PATENT DOCUMENTS

| | | | |
|---|---|---|---|
| 2003/0134193 A1* | 7/2003 | Hanafusa et al. | 429/181 |
| 2009/0136835 A1* | 5/2009 | Nakai et al. | 429/129 |
| 2010/0247992 A1* | 9/2010 | Miyata et al. | 429/94 |

FOREIGN PATENT DOCUMENTS

| | | |
|---|---|---|
| JP | 2000-210784 | 8/2000 |
| JP | 2000-299099 | 10/2000 |
| JP | 2003-109576 | 4/2003 |
| JP | 2004-288656 | 10/2004 |
| JP | 2005-005215 | 1/2005 |
| JP | 2005-038866 | 2/2005 |
| JP | 2007-234276 | 9/2007 |

OTHER PUBLICATIONS

Full Machine Translation of: JP 2000/299099, Yamihira et al., Oct. 24, 2000.*

Japanese Notice of Reasons for Rejection, w/ English translation thereof, issued in Japanese Patent Application No. JP 2009-546995 dated Jul. 27, 2010.

Isamu Miyamoto, et al., "High speed precision welding of thin metal foil by single-mode fiber laser", the 58th Laser Processing Conference of Japan Processing Society, Mar. 2003, pp. 24-35. (In Japanese with English Abstract).

* cited by examiner

FIG. 1
(a) 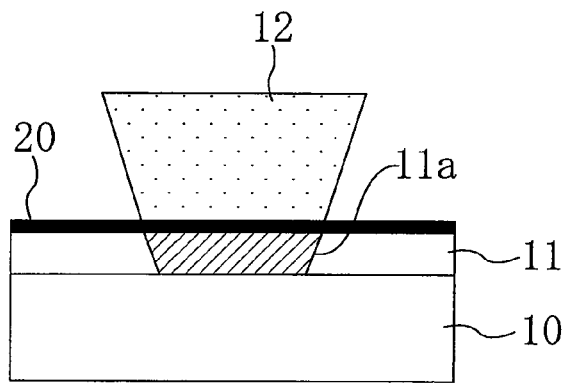
(b) 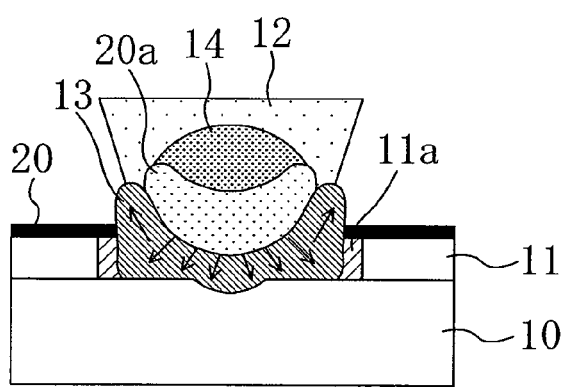
(c) 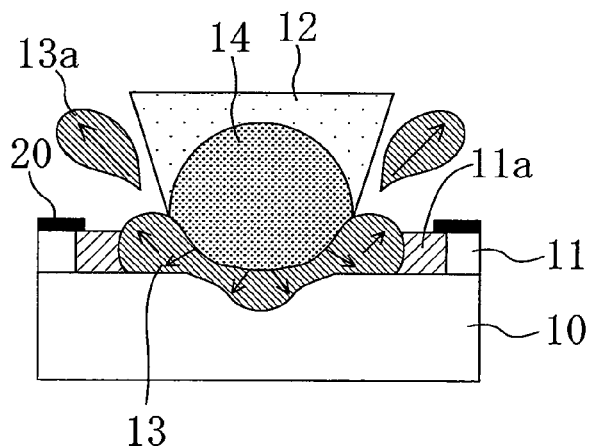
(d) 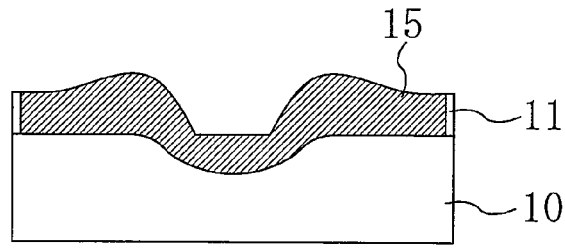

FIG. 2
(a) 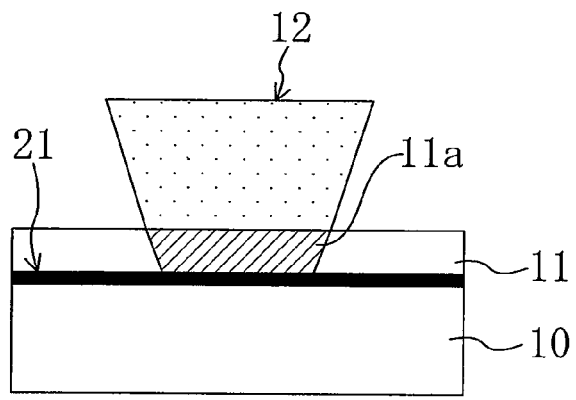
(b) 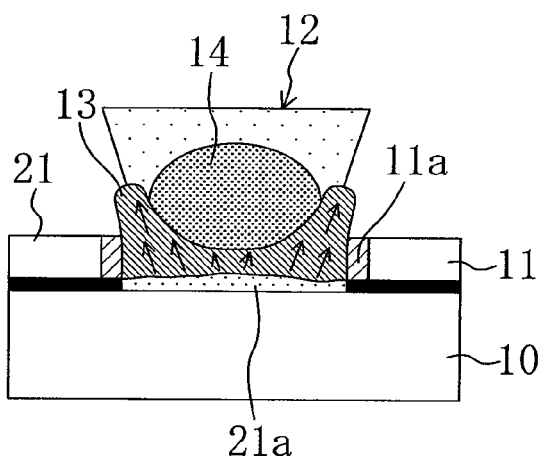
(c) 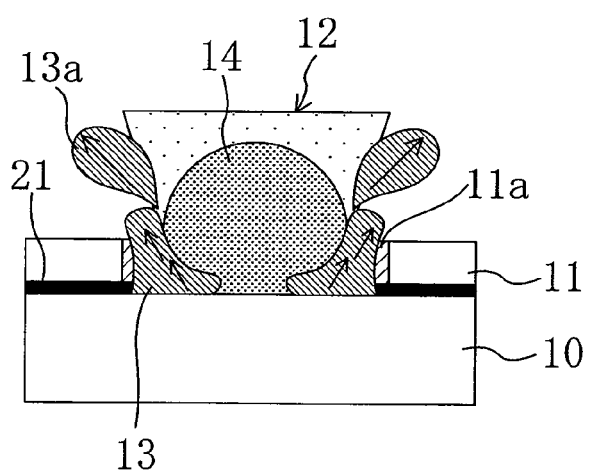
(d) 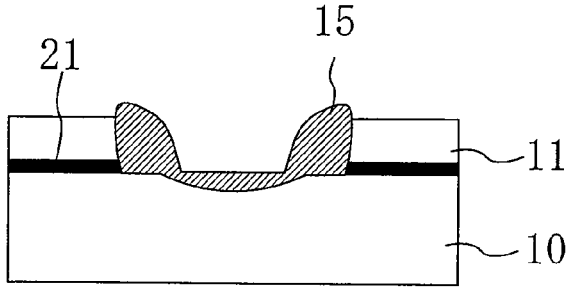

FIG. 3
(a)
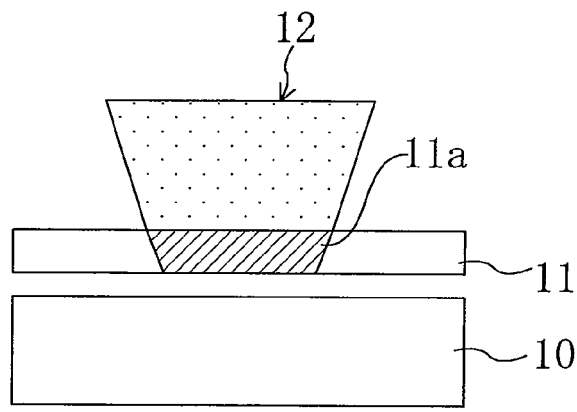
(b)
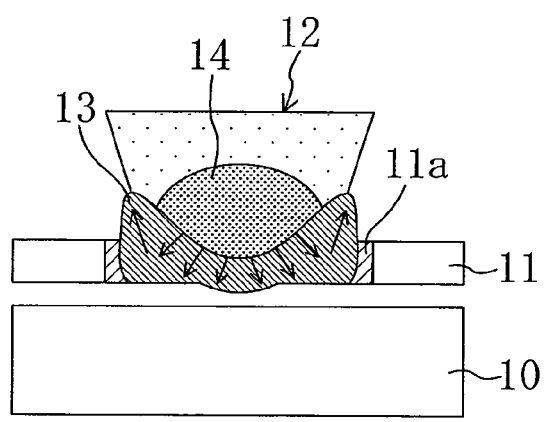
(c)
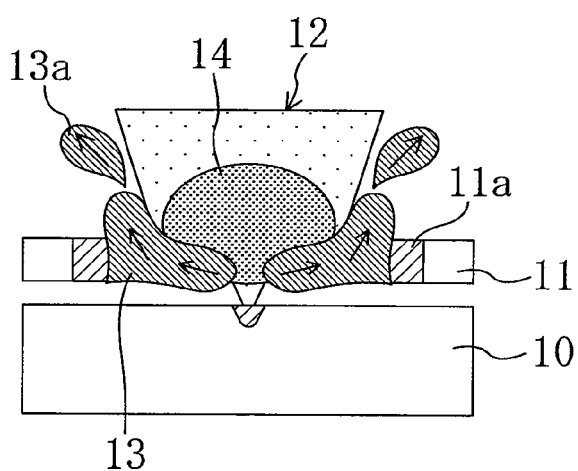
(d)
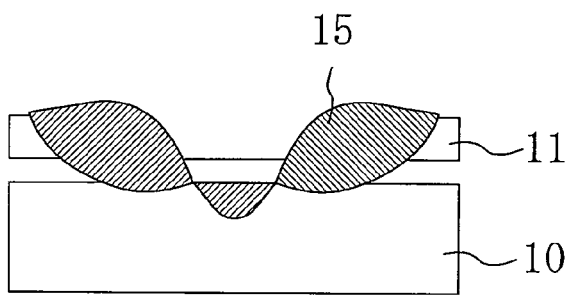

FIG. 4
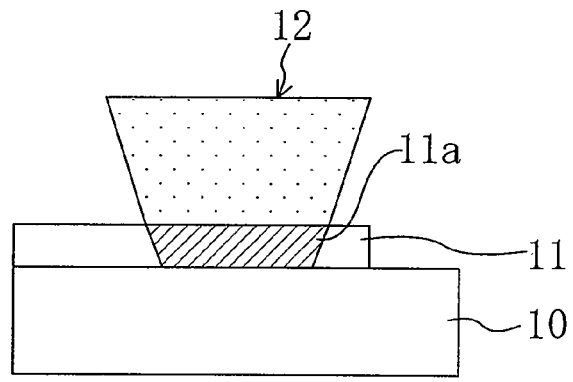
(a)
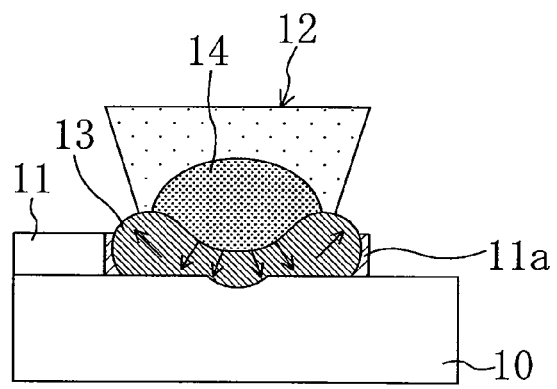
(b)
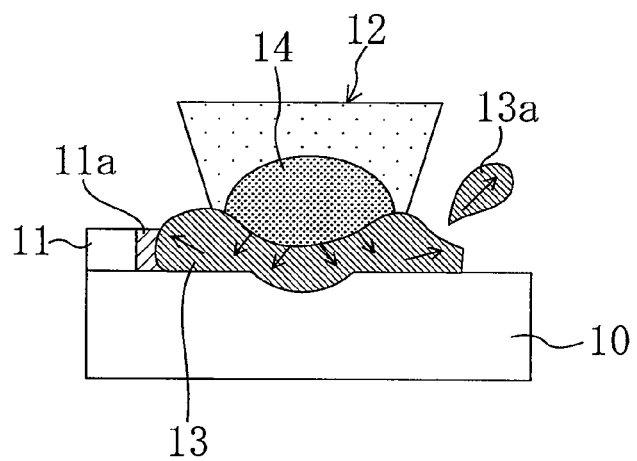
(c)
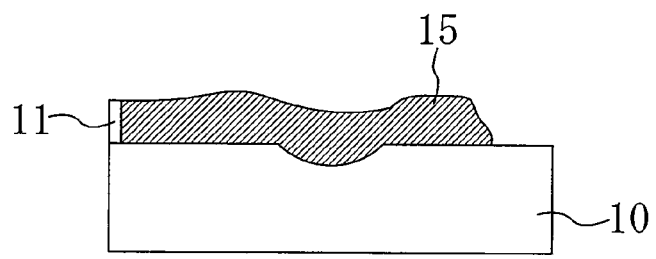
(d)

FIG. 6
(a)
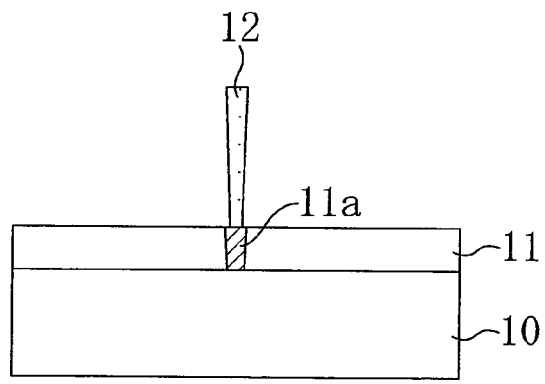
(b)
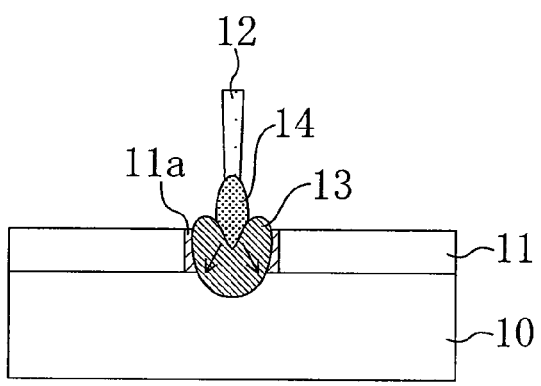
(c)
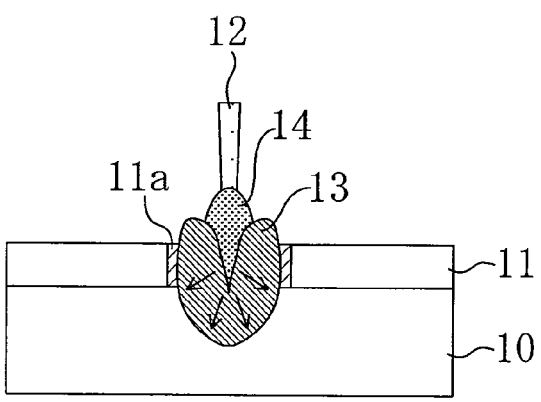
(d)
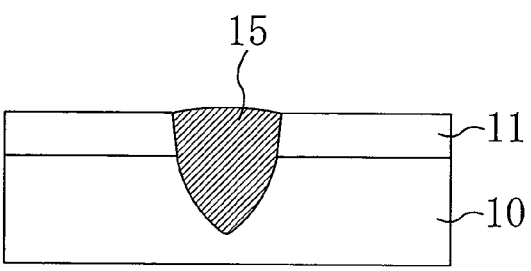

FIG. 7
(a)
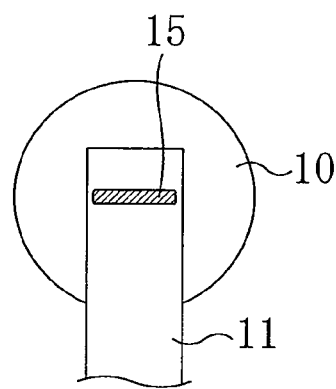
(b)
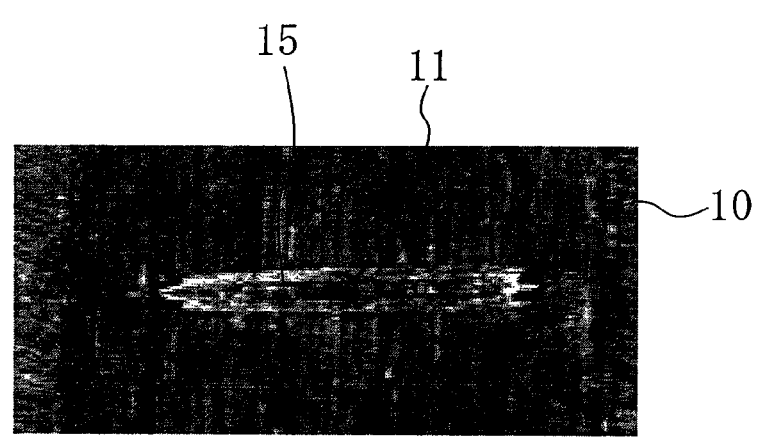
(c)
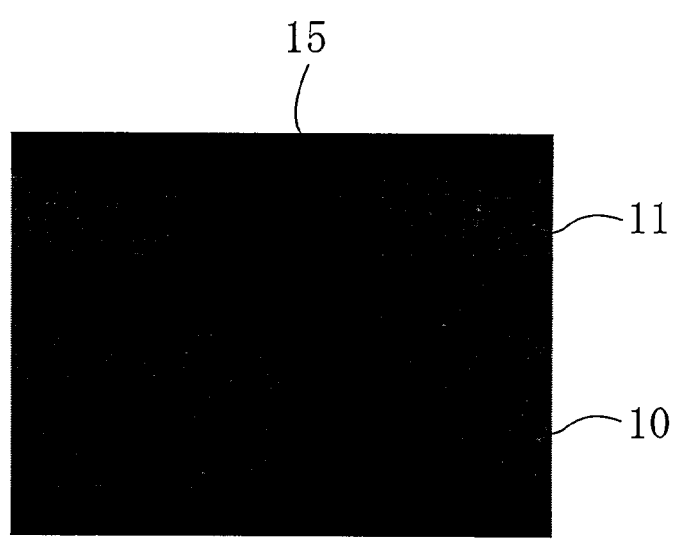

FIG. 12
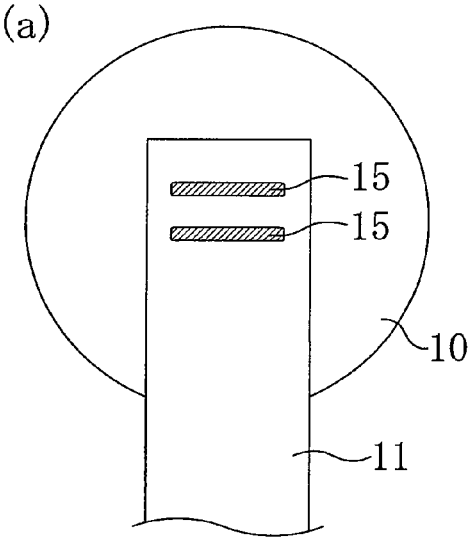
(a)
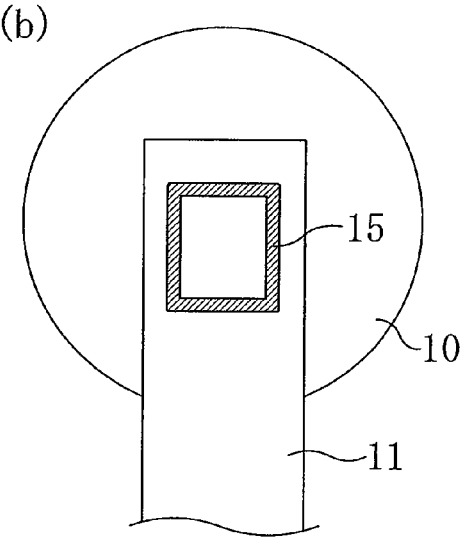
(b)
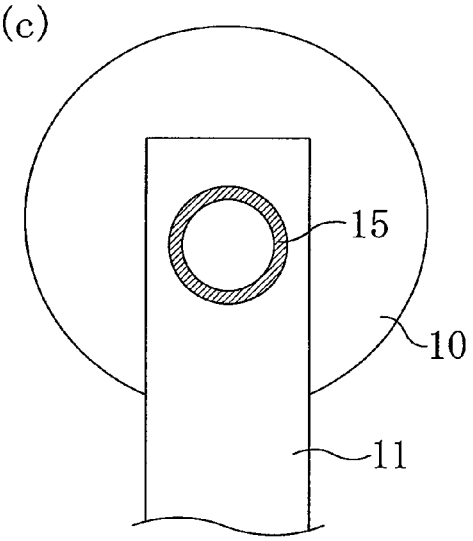
(c)
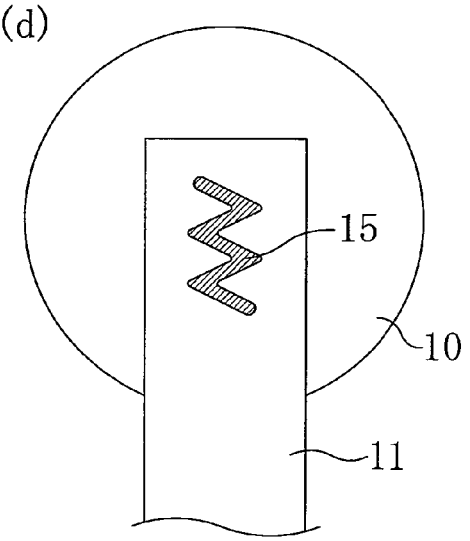
(d)

FIG. 15
(a) 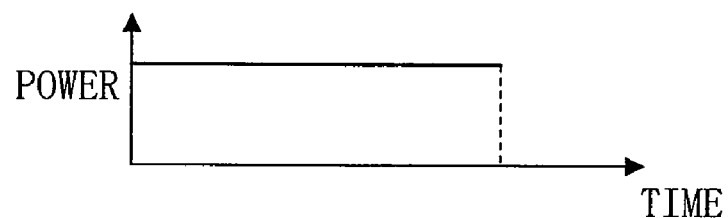
(b) 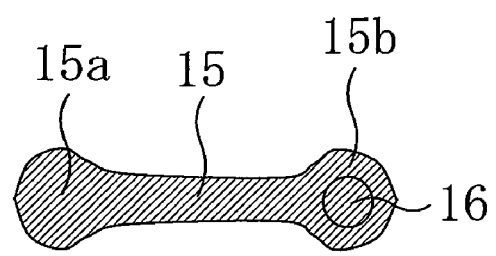
(c) 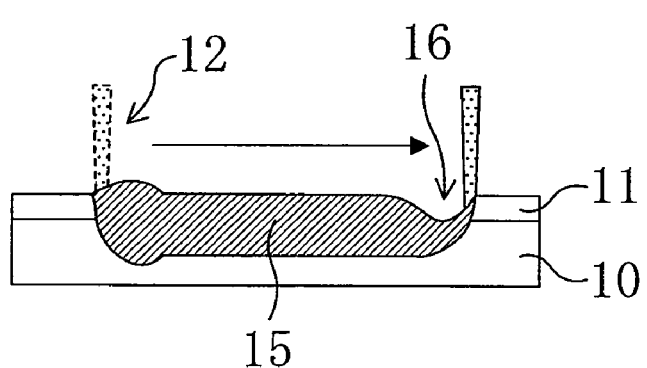
(d) 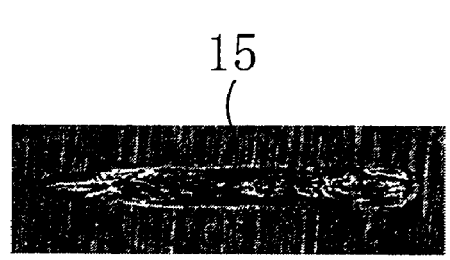

FIG. 16
(a)
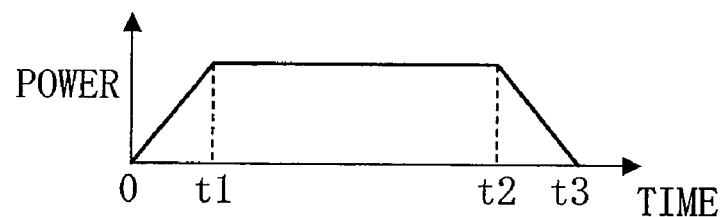
(b)
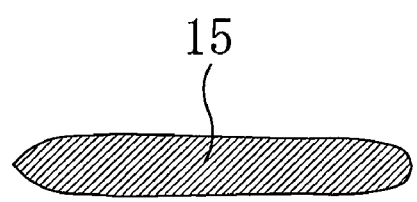
(c)
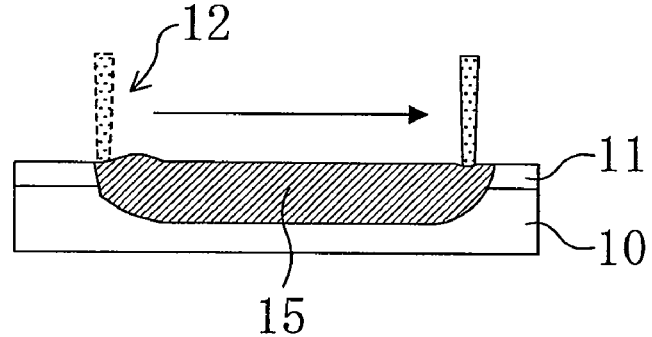
(d)
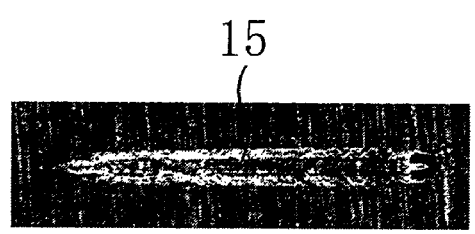

SEALED SECONDARY BATTERY, AND METHOD FOR MANUFACTURING THE BATTERY

RELATED APPLICATIONS

This application is the U.S. National Phase under 35 U.S.C. §371 of International Application No. PCT/JP2009/002854, filed on Jun. 23, 2009, which in turn claims the benefit of Japanese Application Nos. 2008-205418, filed on Aug. 8, 2008, 2008-209836, filed on Aug. 18, 2008, 2008-209838, filed on Aug. 18, 2008, and 2008-275166, filed on Oct. 27, 2008, the disclosures of which Applications are incorporated by reference herein.

TECHNICAL FIELD

The present invention relates to sealed secondary batteries and methods for fabricating sealed secondary batteries, and more particularly to a joint structure between a sealing plate and a lead extending from an electrode group.

BACKGROUND ART

Sealed secondary batteries, including aqueous electrolyte secondary batteries typified by high-capacity alkaline storage batteries and nonaqueous electrolyte secondary batteries typified by lithium-ion secondary batteries, are widely used as power sources for driving mobile equipment or other devices.

These sealed secondary batteries have a sealed structure in which an electrode group formed by stacking or winding a positive electrode plate and a negative electrode plate with a separator interposed therebetween is housed in a battery case together with an electrolyte, and in which an opening of the battery case is sealed with a sealing plate with a gasket sandwiched therebetween. In this structure, a lead extending from one of the electrode plates (e.g., the positive electrode plate) in the electrode group is joined to the sealing plate also serving as an external terminal at one side, whereas a lead extending from the other electrode plate (e.g., the negative electrode plate) in the electrode group is joined to the battery case also serving as an external terminal at the other side. To join the lead to the sealing plate or to the battery case, resistance welding is widely employed.

The opening of the battery case is sealed by resistance-welding the lead extending from the electrode group to the sealing plate, with the electrode group being housed in the battery case, and then bending the lead to seal the opening of the battery case with the sealing plate.

In this process, while the lead is resistance-welded to the sealing plate, substances (mainly metal particles removed from the melted lead) can be sputtered. If these sputtered substances enter the electrode group in the battery case, the separator might be damaged, resulting in an internal short. In another case where sputtered substances adhere to the gasket joined to the periphery of the sealing plate, when the opening of the battery case is sealed with the sealing plate by crimping with a gasket sandwiched therebetween, a narrowed portion of the gasket might be sheared by the adhering substances. Consequently, the battery case and the sealing plate come into contact with each other while sandwiching the adhering substances therebetween, resulting in a short circuit.

To prevent such a short circuit caused by, for example, contamination by sputtered substances, the opening of a battery case may be covered with a thin plate or the like so as to prevent sputtered substances from entering the battery case during resistance welding of the lead to the sealing plate. However, the opening cannot be completely sealed, and thus, such covering is insufficient for preventing contamination by sputtered substances.

On the other hand, joining by ultrasonic welding, instead of resistance welding, does not cause melting as caused by the resistance welding, and thus contamination by sputtered substances can be avoided in principle. However, joining by ultrasonic welding exhibits a lower joint strength than that obtained by the resistance welding. In addition, if the sealing plate has a safety mechanism for explosion protection, ultrasonic vibration might affect the function of the safety mechanism. Further, joining by ultrasonic welding is not preferable in reliability because an active material might be peeled off from the electrode plate.

Since positive electrode plates of lithium secondary batteries generally use aluminium, the leads extending from the positive electrode plates also use aluminium. In addition, to reduce the weight of batteries, the battery cases and the sealing plates have begun to use aluminium. In this case, a joint between the lead and the sealing plate means a joint between aluminium components. In general, an aluminium alloy has a higher electric conductivity and a higher thermal conductivity than those of steel. Accordingly, a large current needs to flow for a short period in resistance welding, resulting in that a welding rod badly wears, and it is difficult to maintain a stable joint for a long period. To prevent this problem, laser welding is employed for welding between the lead and the sealing plate (see, for example, PATENT DOCUMENTS 1 and 2).

This laser welding can considerably narrow a laser beam, thereby obtaining a small welding area. Accordingly, the amount of sputtered substances can be greatly reduced.

CITATION LIST

Patent Document

PATENT DOCUMENT 1: Japanese Patent Publication No. 2000-299099

PATENT DOCUMENT 2: Japanese Patent Publication No. 2007-234276

SUMMARY OF THE INVENTION

Technical Problem

As described above, although welding between the lead and the sealing plate can be inevitably readily affected by sputtering in consideration of its process, the use of laser welding is expected to greatly reduce this influence.

However, a reliability test, including a strength test, performed by the inventors of the present invention on lithium-ion secondary batteries for each of which a lead and a sealing plate were joined by laser welding, showed a certain proportion of short-circuited batteries.

A further examination of the short-circuited batteries confirmed that an internal short circuit was caused by a short circuit occurring between the battery case and the sealing plate due to shearing of the gasket and damage on the separator. This phenomenon was analyzed, and it was found that foreign substances which have caused the short circuit contained aluminium as materials for the lead and the sealing plate.

In view of this result, the phenomenon seems to occur because sputtering is caused by variations in some external factors in fabrication processes during laser welding between the lead and the sealing plate, and the sputtered substances adhere to the gasket or enter the battery case.

It is therefore a main object of the present invention to provide a stable, reliable sealed secondary battery by reducing the influence of sputtering during laser welding between a lead and a sealing plate.

Solution to the Problem

A sealed secondary battery according to the present invention is a sealed secondary battery in which an electrode group formed by stacking or winding a positive electrode plate and a negative electrode plate with a separator interposed therebetween is housed in a battery case, and an opening of the battery case is sealed with a sealing plate. In this sealed secondary battery, a lead extending from one of the positive and negative electrode plates in the electrode group is laser-welded to the sealing plate with application of a laser beam having a spot diameter smaller than a thickness of the lead.

With this configuration, even with a variation in external factors in fabrication processes in welding between the lead and the sealing plate, a joint strength between the lead and the sealing plate can be maintained with sputtering during laser welding being reduced. In this manner, a stable, reliable sealed secondary battery can be obtained.

In the sealed secondary battery, a welded portion formed by parts of the lead and the sealing plate preferably has a penetration depth greater than a bead diameter of the welded portion. With this configuration, the penetration depth of the welded portion formed by parts of the lead and the sealing plate can be increased, thereby increasing the joint strength, and further reducing sputtering during welding.

In the sealed secondary battery, a welded portion formed by parts of the lead and the sealing plate preferably has a linear shape. With this configuration, a stable joint strength can be maintained even with application of shock from various directions to the welded portion.

A method for fabricating a sealed secondary battery according to the present invention is a method for fabricating a sealed secondary battery with the foregoing configuration, and includes the steps of: preparing an electrode group formed by stacking or winding a positive electrode plate and a negative electrode plate with a separator interposed therebetween; connecting one end of a lead to one of the positive and negative electrode plates in the electrode group; housing the electrode group in a battery case; applying, to the lead, a laser beam having a spot diameter smaller than a thickness of the lead, with another end of the lead brought into contact with a sealing plate, thereby laser-welding the another end of the lead to the sealing plate; and sealing an opening of the battery case with the sealing plate.

With this method, even with a variation in external factors in fabrication processes in welding between the lead and the sealing plate, a joint strength between the lead and the sealing plate can be maintained with sputtering being reduced during laser welding. In this manner, a reliable sealed secondary battery can be obtained with stability.

In the method, the laser beam is preferably applied from a fiber laser. The lead is preferably irradiated with the laser beam, while being continuously scanned with a fiber laser. In this manner, a reliable sealed secondary battery can be obtained with stability and controllability.

Advantages of the Invention

The present invention can provide a stable, reliable sealed secondary battery by maintaining a joint strength between a lead and a sealing plate with sputtering being reduced during laser welding even with a variation in external factors in fabrication processes in welding the lead to the sealing plate.

BRIEF DESCRIPTION OF THE DRAWINGS

FIGS. 1(a)-1(d) are cross-sectional views schematically illustrating a process of laser-welding a lead to a sealing plate with a foreign substance attached to the surface of the lead.

FIGS. 2(a)-2(d) are cross-sectional views schematically illustrating a process of laser-welding the lead to the sealing plate with a foreign substance sandwiched at the interface between the lead and the sealing plate.

FIGS. 3(a)-3(d) are cross-sectional views schematically illustrating a process of laser-welding the lead to the sealing plate with a gap created between the lead and the sealing plate.

FIGS. 4(a)-4(d) are cross-sectional views schematically illustrating a process of laser-welding the lead to the sealing plate with an end of the lead irradiated with a laser beam.

FIGS. 6(a)-6(d) are cross-sectional views schematically illustrating a process of laser-welding a lead to a sealing plate according to a first embodiment of the present invention.

FIGS. 7(a)-7(c) are views showing an example in which laser welding between the lead and the sealing plate of the first embodiment is applied to a lithium ion battery. FIG. 7(a) is a conceptual plan view, FIG. 7(b) is a micrograph showing a plan view of a welded portion, and FIG. 7(c) is a micrograph showing a cross section of the welded portion.

FIGS. 12(a)-12(d) are plan views illustrating variations of the shape of a welded portion in the second embodiment.

FIGS. 15(a)-15(d) illustrate a joint structure formed by keyhole welding. FIG. 15(a) is a graph showing a power profile of a laser beam, FIG. 15(b) is a plan view of the welded portion, FIG. 15(c) is a cross-sectional view of the welded portion, and FIG. 15(d) is a micrograph showing a plan view of the welded portion.

FIGS. 16(a)-16(d) schematically illustrate a process of laser-welding a lead to a sealing plate according to a third embodiment of the present invention. FIG. 16(a) is a graph showing a power profile of a laser beam, FIG. 16(b) is a plan view of a welded portion, the FIG. 16(c) is a cross-sectional view of the welded portion, and FIG. 16(d) is a micrograph showing a plan view of the welded portion.

DESCRIPTION OF EMBODIMENTS

Figure 5:
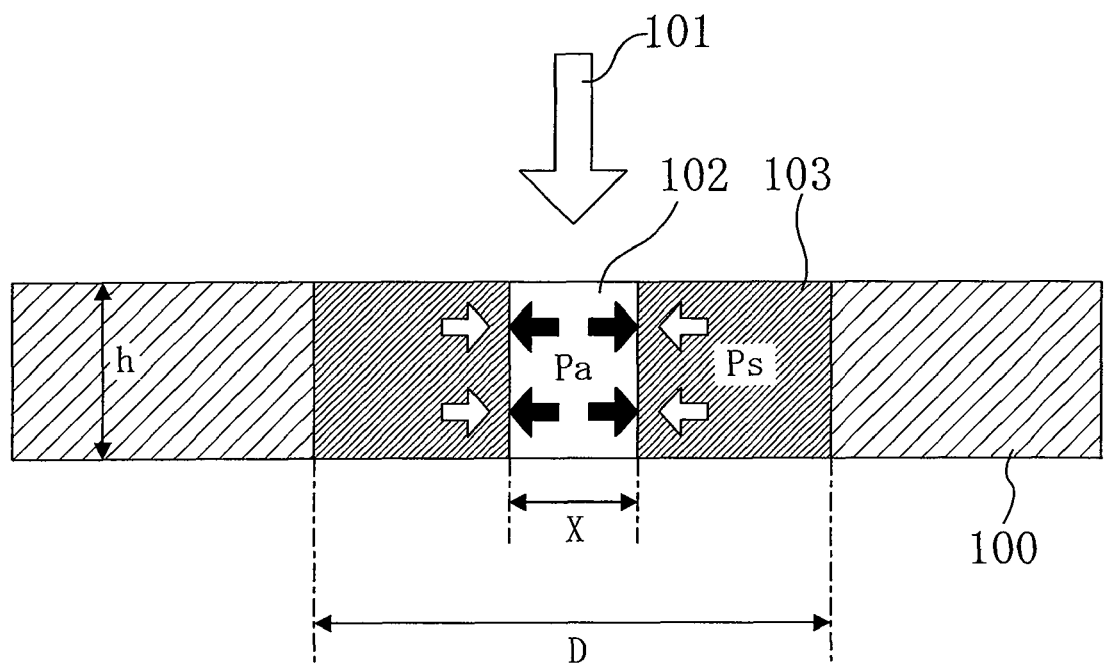
FIG. 5 is a conceptual view illustrating the principle of keyhole welding.

The inventors of the present invention arrived at the following idea. Despite the assumption that the influence of sputtering in welding between the lead and the sealing plate is very small because the laser welding requires a very small melted area, a short circuit which seems to be due to, for example, contamination by sputtered substances is caused by variations in some external factors in fabrication processes.

Specifically, foreign substances created in fabrication processes might adhere to the surface of the lead or the surface of the sealing plate during the welding between the lead and the sealing plate. In addition, although the lead and the sealing plate are welded together while being in contact with each other, the pressure during the welding is low, and thus a gap might be formed between the lead and the sealing plate during the welding. Further, a laser beam might strike different positions in a portion to be welded between the lead and the sealing plate.

FIGS. 1(a)-1(d) are cross-sectional views schematically illustrating a process of laser-welding a lead 11 to a sealing plate 10 with a foreign substance 20 attached to the surface of the lead 11.

As illustrated in FIG. 1(a), when a laser beam 12 is applied to the lead 11 which is in contact with the sealing plate 10, a region 11a of the lead 11 irradiated with the laser beam 12 is heated. Then, as illustrated in FIG. 1(b), the heated region 11a partially melts to form a melted portion 13, and the melted portion 13 evaporates to generate plasma 14. At this time, the foreign substance 20 heated by irradiation with the laser beam 12 also evaporates, and gas produced by this evaporation considerably increases in volume. Consequently, as illustrated in FIG. 1(c), the melted portion 13 expands, and in addition, a compressive force exerted by the volume expansion of the gas produced by evaporation causes melted metal to be partially sputtered. Thereafter, when the application of the laser beam 12 is stopped, the melted portion 13 is cooled to be solidified, as illustrated in FIG. 1(d), thereby completing joining of the lead 11 and the sealing plate 10. Such sputtering forms a recess in a welded portion (i.e., a melted portion) 15 of the lead 11.

If the foreign substance 20 adheres to the surface of the lead 11 in the manner as described above, a rapid volume expansion due to evaporation of this foreign substance 20 exerts a compressive force, thereby increasing the amount of sputtering.

FIGS. 2(a)-2(d) are cross-sectional views schematically illustrating a process of laser-welding the lead 11 to the sealing plate 10 with a foreign substance 21 sandwiched at the interface between the lead 11 and the sealing plate 10. A phenomenon observed in this process is basically the same as that observed when the foreign substance 20 adheres to the surface of the lead 11. However, since the foreign substance 21 exists in the interface between the lead 11 and the sealing plate 10, a compressive force exerted by volume expansion of gas generated from the foreign substance 21 causes melted metal to be partially sputtered, thereby increasing the amount of sputtering. Accordingly, as illustrated in FIG. 2(d), a larger recess is formed in the welded portion of the lead 11. Therefore, since a lubricant such as grease is used for a sliding part of apparatus used for assembly of the sealing plate 10, grease might adhere to the surface of the sealing plate 10 during the assembly of the sealing plate 10.

FIGS. 3(a)-3(d) are cross-sectional views schematically illustrating a process of laser-welding the lead 11 to the sealing plate 10 with a gap created between the lead 11 and the sealing plate 10.

In this case, as illustrated in FIG. 3(a), irradiation of the lead 11 with the laser beam 12 heats only the laser-irradiated region 11a of the lead 11. However, since no heat is transferred to the sealing plate 10, the temperature of the region 11a rapidly increases, and as illustrated in FIG. 3(b), the temperature of the melted portion 13 of the region 11a also rapidly increases. As a result, as illustrated in FIG. 3(c), melted metal is partially sputtered. In this case, as illustrated in FIG. 3(d), a large recess is formed in the welded portion 15 of the lead 11.

FIGS. 4(a)-4(d) are cross-sectional views schematically illustrating a process of laser-welding the lead 11 to the sealing plate 10 with a shift of an application position of a laser beam, i.e., in a situation where an end of the lead 11 is irradiated with the laser beam 12.

In this case, as illustrated in FIG. 4(a), even when the laser-irradiated region 11a is heated, no heat is transferred to an end of the lead 11. Accordingly, the temperature of the region 11a rapidly increases, and as illustrated in FIG. 4(b), the melted portion 13 of the region 11a also rapidly expands. As a result, as illustrated in FIG. 4(c), melted metal is partially sputtered.

Problems as described above inevitably arise during laser welding between the lead 11 and the sealing plate 10 because of variations in external factors in fabrication processes. Therefore, laser welding which does not cause sputtering even with such a variation in external factors, is required.

Since the thickness of the lead 11 is much thinner (typically about 0.2 mm) than that of the sealing plate 10, conventional laser welding employs welding of a heat conduction type so as not to form a recess in a welded portion of the lead 11 as described above. However, this type of welding increases the melted area, resulting in difficulty in reducing sputtering due to variations in external factors.

In view of this fact, the inventors of the present invention thought that deep penetration welding (i.e., keyhole welding), instead of the heat conduction type welding, would reduce a melted area, and thereby, laser welding with reduced sputtering would be achieved even with a variation in external factors.

FIG. 5 is a conceptual view illustrating the principle of keyhole welding in which a keyhole 102 with a diameter X is formed by applying a laser beam 101 to a plate member 100 with a thickness h. The keyhole 102 can be maintained by balancing an evaporation repulsive force Pa of metal vapor from the melted plate member 100 and a surface tension Ps of the melted plate member 100.

At this time, surface energy E (X) of the keyhole 102 is generally expressed by the following Equation (1):

$$E(X)=\pi G[hX+\tfrac{1}{2}(D^2-X^2)] \quad \text{Equation (1)}$$

where G is the surface energy of liquid metal of the plate member 100, and D is the diameter of the melted region 103 (see, for example, Isamu Miyamoto; "High speed precision welding of thin metal foil by single-mode fiber laser"; the 58th Laser Processing Conference of Japan Laser Processing Society; March, 2003).

From Equation (1), Equation (2) is obtained as follows:

$$dE/dX=\pi G(h-X) \quad \text{Equation (2)}$$

According to Equation (2), if X>h, the relationship of dE/dX<0 is established.

In this case, an increase in the diameter X (dX) of the keyhole 102 reduces the surface energy E (dE), resulting in that the diameter X of the keyhole 102 increases. On the other hand, if X<h, the relationship of dE/dX>0 is established. In this case, an increase in the diameter X (dX) of the keyhole 102 increases the surface energy E (dE), resulting in that the diameter X of the keyhole 102 decreases, and the surface tension Ps is balanced with the evaporation repulsive force Pa.

Accordingly, the use of a laser beam 101 having a spot diameter smaller than the thickness h of the plate member 100 enables stable keyhole welding.

As described above, since the lead 11 typically has a thickness of about 0.2 mm, a YAG laser used in conventional laser welding has a spot diameter of at least about 0.3 mm. Thus, stable keyhole welding cannot be performed with such a YAG laser.

Although an increase in the thickness of the lead 11 in an amount corresponding to the thickness of a welded portion of the lead 11 enables keyhole welding to be performed, the volumetric efficiency decreases according to the amount of increase in the thickness of the lead 11, and an increase in the battery capacity is inhibited. Thus, it is difficult to actually employ this technique. In addition, power of a laser beam needs to be increased according to the increase in the thickness of the lead 11, thereby promoting occurrence of sputtering.

In view of these facts, the inventors of the present invention have focused on fiber laser. Specifically, the spot diameter of the fiber laser can be greatly reduced to about 0.02 mm, which is sufficiently smaller than (typically about $1/5$ to about $1/10$ of) the thickness of the lead 11, thereby achieving stable keyhole welding. Accordingly, deep penetration welding can be performed, thereby obtaining a small melted area between the lead and the sealing plate. Consequently, even with a variation in external factors in fabrication processes, it is possible to perform laser welding, while reducing sputtering.

Since the spot diameter of the fiber laser is about $1/10$ of that of a YAG laser, the joint strength might decrease as the melted area decreases. However, if a linear melted portion is formed by continuous scanning with a continuously oscillating fiber laser, a joint strength almost equal to or greater than that obtained with a YAG laser can be maintained.

Embodiments of the present invention will be described hereinafter with reference to the drawings. It should be noted that the present invention is not limited to the following embodiments. Various changes and modifications may be made without departing from the scope of the present invention. The following embodiments may be combined as necessary.

First Embodiment

FIGS. 6(a)-6(d) are cross-sectional views schematically illustrating a process of laser-welding a lead 11 to a sealing plate 10 according to a first embodiment of the present invention.

As illustrated in FIG. 6(a), the lead 11 is irradiated with a fiber laser beam (hereinafter simply referred to as a "laser beam") 12 with the lead 11 brought into contact with the sealing plate 10, thereby heating a laser-irradiated region 11a of the lead 11. The laser beam 12 has a spot diameter smaller than the thickness of the lead 11.

As illustrated in FIG. 6(b), the heated region 11a partially melts to form a melted portion 13, and an evaporation repulsive force of metal vapor from the melted lead 11 forms a keyhole. Then, as illustrated in FIG. 6(c), as the keyhole further grows, the melted portion 13 is also extended beyond the surface of the sealing plate 10. Thereafter, when the irradiation with the laser beam 12 is stopped, the melted portion 13 is hardened to fill the keyhole, as illustrated in FIG. 6(d), thereby completing joining of the lead 11 and the sealing plate 10.

At this time, the welded portion 15 formed by parts of the lead 11 and the sealing plate 10 has a structure of deep penetration welding. The shape of the welded portion 15 is not specifically limited, but the penetration depth of the welded portion 15 formed by parts of the lead 11 and the sealing plate 10 is preferably larger than the bead diameter in the welded portion 15. The shape of this welded portion 15 is controlled by adjusting the spot diameter, the power density, and the application time of the laser beam 12, for example. The spot diameter of the laser beam 12 needs to be smaller than the thickness of the lead 11 in order to perform keyhole welding, and is preferably less than or equal to $1/2$, and more preferably less than or equal to $1/5$, of the thickness of the lead 11 in order to perform more stable keyhole welding.

FIGS. 7(a)-7(c) are views showing an example in which laser welding between the lead 11 and the sealing plate 10 of the present invention is applied to a lithium ion battery. Specifically, FIG. 7(a) is a conceptual plan view, FIG. 7(b) is a micrograph showing a plan view of the welded portion 15, and FIG. 7(c) is a micrograph showing a cross section of the welded portion 15.

Here, the lead 11 extending from the positive electrode in the electrode group of the lithium ion battery was made of aluminium foil having a thickness of 0.15 mm and a width of 4 mm. The sealing plate 10 was made of an aluminium plate having a thickness of 0.1 mm (in a portion welded to the lead 11) and a diameter of 16.8 mm. The laser beam having a spot diameter of 0.02 mm and a power density of $7 \times 10^7$ W/cm$^2$ was employed, and was continuously applied at a scanning speed of 5 m/min.

As shown in FIGS. 7(b) and 7(c), the welded portion 15 formed by parts of the lead 11 and the sealing plate 10 had a melting width (i.e., a bead width) of 0.3 mm, a welding length of 2.5 mm, and a penetration depth of 0.4 mm, to show deep penetration welding. This result shows that spot diameters of the laser beam smaller than the thickness of the lead 11 enable keyhole welding to be performed.

No sputtering was observed during the laser welding, and the joint strength was about 30 N. This result shows that even with a variation in external factors in fabrication processes, laser welding with reduced sputtering is enabled, and that continuous scanning with a laser beam to form the linear welded portion 15 maintains a joint strength almost equal to or greater than the joint strength obtained with a YAG laser. The linear shape of the welded portion 15 formed by parts of the lead 11 and the sealing plate 10 can maintain a stable joint strength even with an application of shock from various directions to the welded portion 15.

As shown in FIG. 7(c), the bead diameter of the welded portion 15 formed by parts of the lead 11 and the sealing plate 10 is extended to be about 15 times as large as the spot diameter of the laser beam. This extension of the bead diameter varies depending on, for example, the thickness of the lead 11 and the penetration depth of the welded portion 15.

Figure 8:
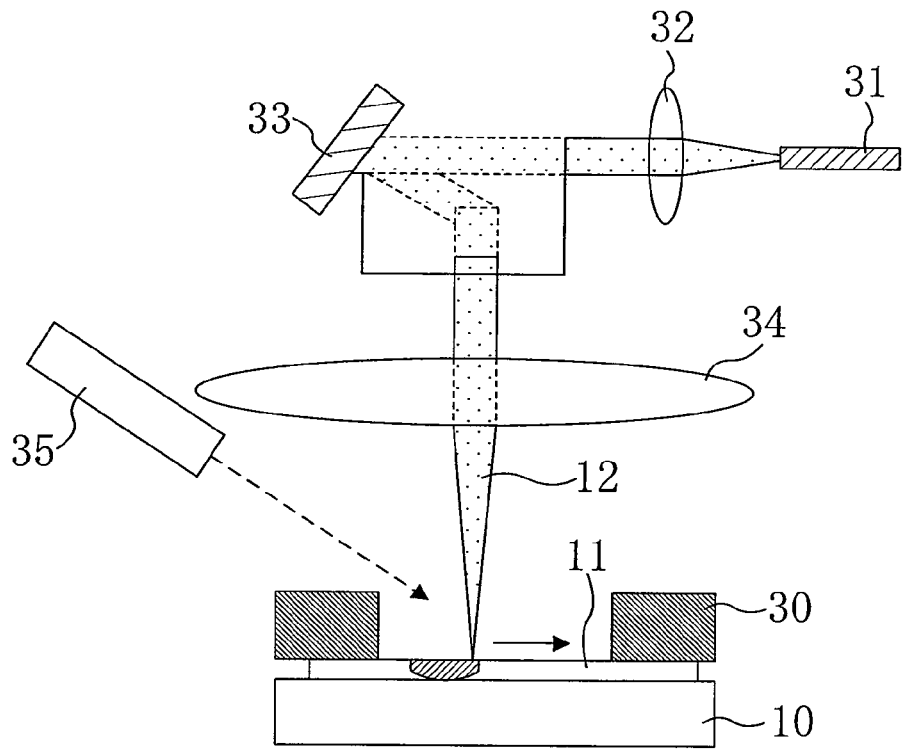
FIG. 8 is a view illustrating a scanning technique with a fiber laser according to the first embodiment.

FIG. 8 is a view illustrating a scanning technique with a fiber laser. A laser beam 12 emitted from an end facet of a fiber laser 31 is changed into a collimated beam having a beam diameter of 12 mm with a collimator lens 32. Then, the surface of the lead 11 is irradiated with the laser beam while being continuously scanned with a galvano scanner 33 and an fθ lens. At this time, the spot diameter of the laser beam 12 applied to the lead 11 is reduced to the range from 0.01 mm to 0.1 mm. The galvano scanner 33 controls the scanning speed and the scanning direction of the laser beam 12. To prevent oxidation, for example, of the welded portion, shielding gas such as nitrogen may be blown to the welded portion through a gas supply nozzle 35.

Figure 9:
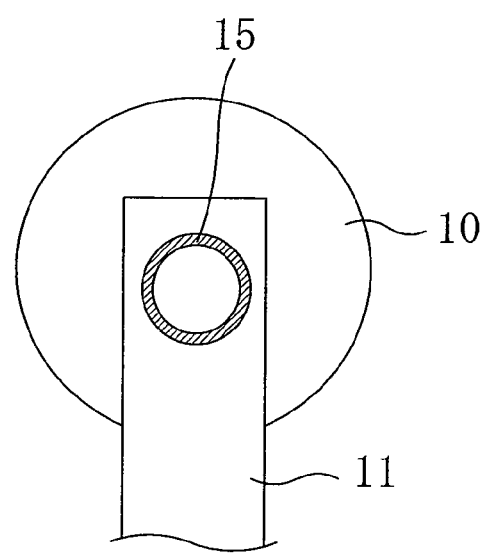
FIG. 9 is a plan view illustrating an example in which the welded portion of the first embodiment has a ring shape in plan view.

FIG. 9 is a plan view illustrating an example in which the galvano scanner 33 performs scanning with the laser beam 12 to form the welded portion 15 into a ring shape in plan view.

The use of the galvano scanner 33 in this manner can provide an easy setting of the shape of the welded portion 15, resulting in that the shape of the welded portion 15 can be changed to be suitable for various types of batteries.

Figure 10:
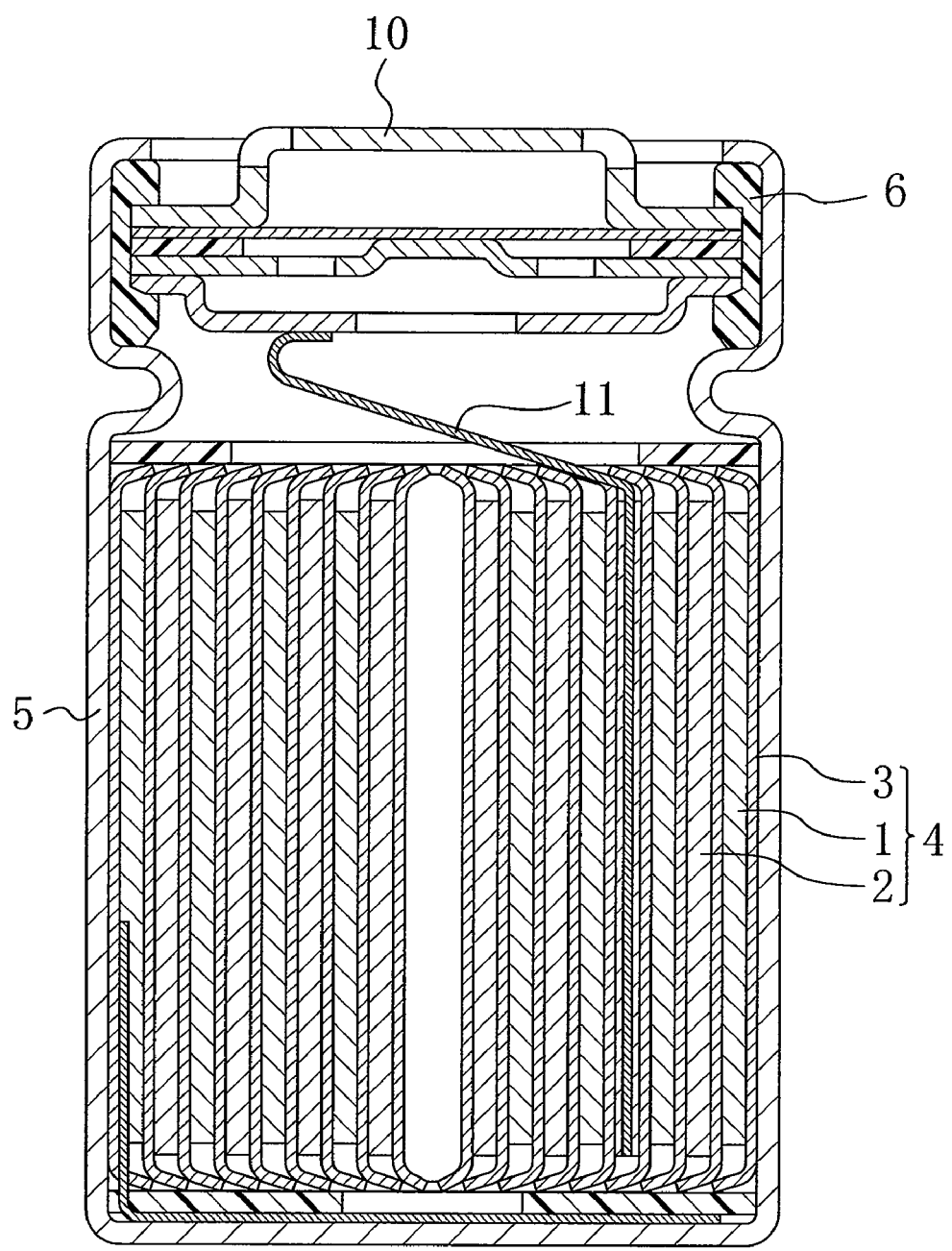
FIG. 10 is a cross-sectional view schematically illustrating a configuration of a sealed secondary battery according to the first embodiment.

FIG. 10 is a cross-sectional view schematically illustrating a configuration of a sealed secondary battery according to this embodiment. As illustrated in FIG. 10, a electrode group 4 formed by winding a positive electrode plate 1 and a negative electrode plate 2 with a separator 3 interposed therebetween, is housed in a battery case 5. An opening of the battery case 5 is sealed with a sealing plate 10 by crimping, with a gasket 6 sandwiched therebetween. A lead 11 extending from one of the positive and negative electrode plates in the electrode group 4 is laser-welded to the sealing plate 10 with a laser beam having a spot diameter smaller than the thickness of the lead 11.

This configuration can reduce sputtering during laser welding, while maintaining the joint strength between the lead 11 and the sealing plate 10, even with a variation in external factors in fabrication processes in welding between the lead 11 and the sealing plate 10. Accordingly, a stable, reliable sealed secondary battery can be obtained.

The sealed secondary battery of this embodiment can be fabricated in the following manner.

First, an electrode group 4 formed by stacking a positive electrode plate 1 and a negative electrode plate 2 with a separator 3 interposed therebetween, is prepared, and an end of the lead 11 is connected to one of the positive and negative electrode plates in the electrode group 4. Thereafter, the electrode group 4 is housed in a battery case 5, the other end of the lead 11 is brought into contact with the sealing plate 10, and then the surface of the lead 11 is continuously scanned with a laser beam, thereby laser-welding the other end of the lead 11 (i.e., the end of the lead 11 which is in contact with the sealing plate 10) to the sealing plate 10. Then, an opening of the battery case 5 is sealed with the sealing plate 10 by crimping, with a gasket 6 sandwiched therebetween, thereby completing fabrication of a sealed secondary battery.

Second Embodiment

The spot diameter of a fiber laser is about 1/10 of that of a YAG laser. Thus, the joint strength might decrease as the welding area decreases. Accordingly, a large number of welded portions are necessary for ensuring a sufficient joint strength. However, laser welding of a plurality of portions with a laser beam producing pulse oscillation causes repetitive state changes among heating, melting, and solidification, resulting in that sputtering readily occurs. In addition, some welded portions might be unstable, and as a result, a stable joint strength might not be obtained.

In view of these problems, in order to obtain a stable joint structure without occurrence of sputtering, a technique for forming a linear melted portion by performing continuous scanning with a continuously oscillating fiber laser is proposed in this embodiment. With this technique, a joint structure having a joint strength almost equal to or greater than the joint strength obtained with a YAG laser can be obtained. In addition, the linear shape of the welded portion formed by parts of the lead and the sealing plate can maintain a stable joint strength even with an application of shock from various directions to the welded portion.

Figure 11:
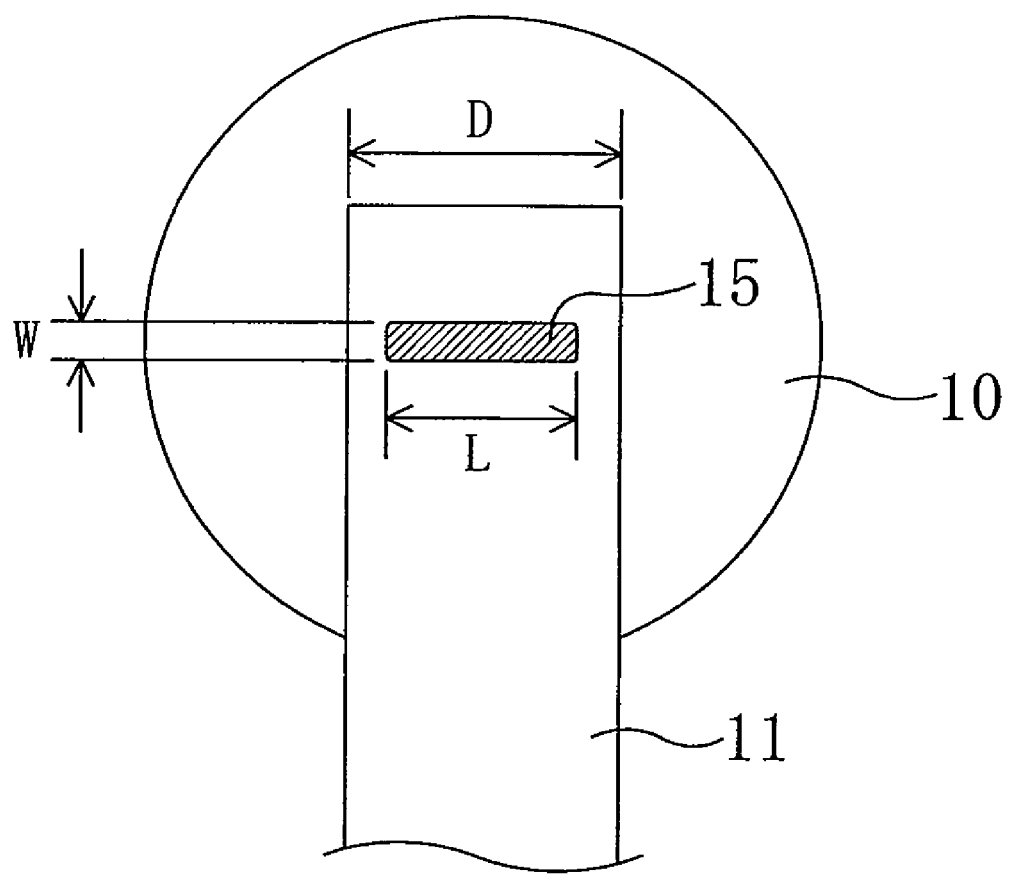
FIG. 11 is a plan view illustrating a technique of laser-welding a lead to a sealing plate according to a second embodiment of the present invention.

FIG. 11 is a plan view illustrating a technique of laser-welding a lead 11 to a sealing plate 10 according to this embodiment. As illustrated in FIG. 7, the lead 11 extending from an electrode group and being in contact with the sealing plate 10 at one end, is continuously scanned, along the width of the lead 11, with a laser beam having a spot diameter smaller than the thickness of the lead 11, thereby laser-welding the end of the lead 11 to the sealing plate 10. At this time, a welded portion 15 formed by parts of the lead 11 and the sealing plate 10 has a linear shape. The ratio of the welding length L to the welding width in the welded portion 15 is preferably at least four, and preferably at least eight. The welding length of the welded portion 15 is preferably at least ⅓ of the width of the lead 11. In this case, a joint structure having a joint strength almost equal to or greater than the joint strength obtained with a YAG laser, can be obtained.

For example, when a lead 11 made of aluminium foil having a thickness of 0.15 mm and a width of 4 mm was laser-welded to a sealing plate 10 made of an aluminium plate having a thickness of 0.1 mm (in a portion welded to the lead 11) and a diameter of 16.8 mm by applying a laser beam having a spot diameter of 0.02 mm and a power density of $7 \times 10^7$ W/cm$^2$ at a scanning speed of 10 m/min. for 18 msec., the resultant welded portion 15 had a welding length L of about 2 mm and a welding width W of 0.3 mm. At this time, the joint strength was about 28 N, which is almost equal to or greater than the joint strength with a YAG laser. During the laser welding, no sputtering was observed.

In this embodiment, the linear shape of the welded portion 15 is not specifically limited. However, to increase the joint strength between the lead 11 and the sealing plate 10 or to reduce the contact resistance between the lead 11 and the sealing plate 10, the welded portion 15 preferably has linear shapes as illustrated in FIGS. 12(a)-12(d).

FIG. 12(a) illustrates an example in which the welded portion 15 is made of at least two separate lines. In this example, the total length of the welded portion 15 is increased, thereby increasing the joint strength between the lead 11 and the sealing plate 10. In the example illustrated in FIG. 12(a), two parallel lines of the welded portion 15 are oriented perpendicularly to the longitudinal direction of the lead 11, but may be in parallel with the longitudinal direction of the lead 11. Alternatively, two straight lines of the welded portion 15 may extend perpendicularly to each other, or the lines of the welded portion 15 may be curved.

FIGS. 12(b) and 12(c) illustrate examples in which the welded portion 15 forms a continuous closed line and a continuous closed curve, respectively. Specifically, FIG. 12(b) shows an example in which the welded portion 15 is rectangular, and FIG. 12(c) shows an example in which the welded portion 15 is circular. In these examples, the total length of the welded portion 15 can be increased, and the lead 11 and the sealing plate 10 can be in contact with each other in the entire region enclosed with the closed line or the closed curve. Accordingly, the joint strength between the lead 11 and the sealing plate 10 can be increased, and in addition, the contact resistance between the lead 11 and the sealing plate 10 can be reduced. If the lead 11 and the sealing plate 10 are insufficiently in contact with each other in the entire region enclosed with the closed line or the closed curve, an additional welded portion 15 may be formed in the region enclosed with the closed line or the closed curve.

The "linear shape" herein includes a zigzag pattern as illustrated in FIG. 12(d), for example.

Figure 13:
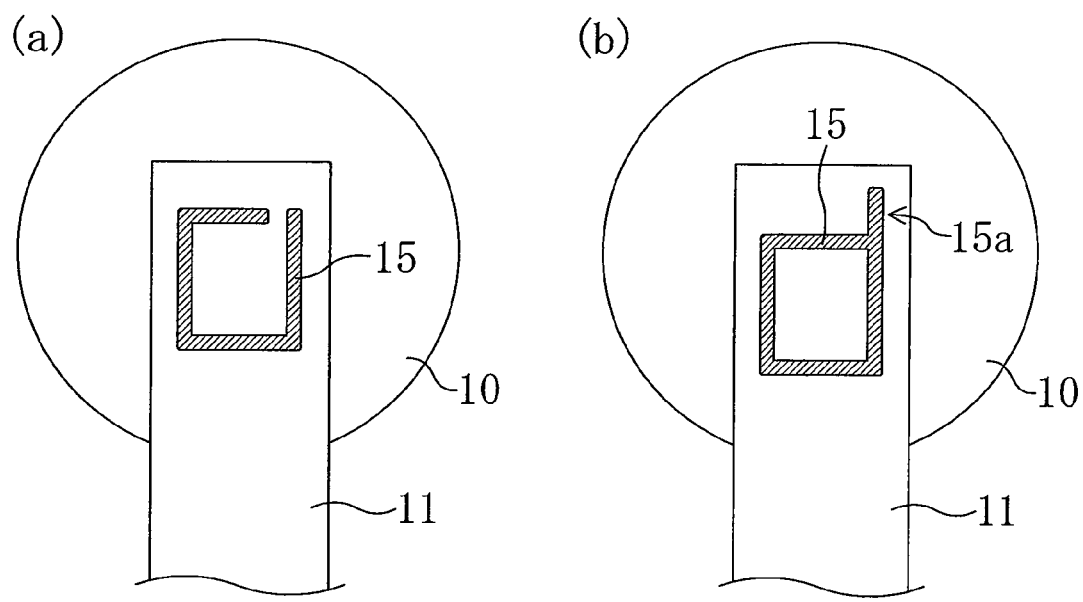
FIGS. 13(a) and 13(b) are plan views illustrating variations of the shape of the welded portion in a case where the welded portion of the second embodiment forms a closed line.

If the welded portion 15 is in the shape of a closed line or a closed curve as illustrated in FIGS. 12(b) and 12(c), the laser beam 12 is applied twice because the beginning of the closed line or the closed curve overlaps with the end thereof. As a result, an opening might be formed at different positions. To prevent such formation of an opening, in the case of a closed line, for example, the end of the closed line is preferably located at a position which does not overlap with the beginning of the closed line, as illustrated in FIG. 13(a). In this case, the welded portion 15 substantially forms a closed line, the advantages described above can be obtained. Alternatively, as illustrated in FIG. 13(b), the end of the closed line may not be located at a position which overlaps with the beginning of the closed line, and may extend to a position slightly away from the beginning of the closed line (i.e., to have a portion 15a in FIG. 13(b)). The power of the laser beam 12 is kept constant during continuous scanning, but is increased at stopping of the scanning of the laser beam 12. Thus, if the end of the closed line is located at a position which does not overlap with the beginning thereof, formation of openings can be avoided even when the laser beam is applied twice to the beginning. If the welded portion 15 is a closed curve, similar configurations to those for the closed line may be employed.

FIGS. 14(a)-14(d) are views illustrating processes after laser-welding the lead 11 extending from one of the electrode plates in the electrode group 4 to the sealing plate 10, and before sealing the opening of the battery case 5 with the sealing plate 10.

Figure 14:
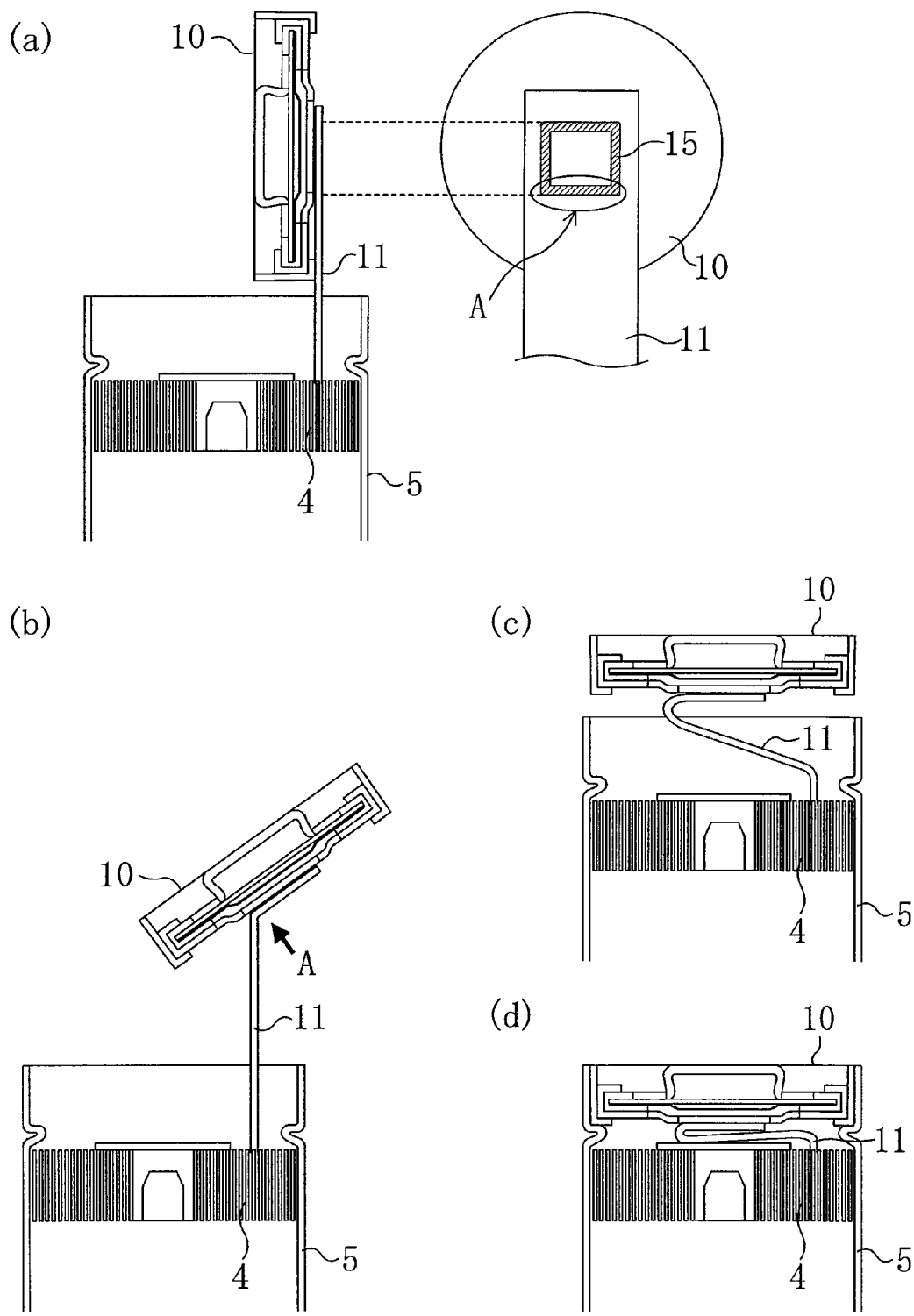
FIGS. 14(a)-14(d) are views illustrating a process of sealing an opening of a battery case with a sealing plate according to the second embodiment.

First, as illustrated in FIG. 14(a), the sealing plate 10 is placed near the opening of the battery case 5, and is positioned substantially perpendicularly to the opening plane. At the same time, an end of the lead 11 extending beyond the opening of the battery case 5 is brought into contact with the sealing plate 10. In this state, the lead 11 is irradiated with a laser beam, thereby laser-welding the end of the lead 11 to the sealing plate 10.

Next, as illustrated in FIGS. 14(b)-14(d), the sealing plate 10 is moved toward the opening, while being gradually tilted from the substantially perpendicular position to the opening plane of the battery case 5 to a parallel position to the opening plane of the battery case 5. Then, the opening of the battery case 5 is sealed with the sealing plate 10. At this time, part of the lead 11 extending beyond the opening of the battery case 5 is bent, and is housed in the battery case 5. However, since the lead 11 is soft, the position at which the lead 11 is to be bent cannot be fixed, and thus, part of the lead 11 might come into contact with the battery case 5 at some bent positions.

To prevent this problem, the welded portion 15 is formed to have a linear portion A which is perpendicular to the longitudinal direction of the lead 11, as illustrated in FIG. 14(a). In sealing the opening of the battery case 5 with the sealing plate 10 while bending the lead 11, this portion A of the welded portion 15 enables control of the bent position of the lead 11, as illustrated in FIG. 14(b). In this manner, it is possible to prevent the lead 11 from being in contact with the battery case 5, thereby stably housing the lead 11 in the battery case 5.

Further, in sealing the opening of the battery case 5 with the sealing plate 10 while bending the lead 11, the lead 11 might be peeled off in the longitudinal direction of the lead 11. To prevent peeling, the welded portion 15 is formed to have another linear portion which is parallel to the longitudinal direction of the lead 11, as illustrated in FIG. 14(a), thereby also preventing the lead from peeling off.

Specifically, in the process of sealing the opening of the battery case 5 with the sealing plate 10 while bending the lead 11, in order to solve the problem of contact between part of the lead 11 and the battery case 5 and the problem of peeling-off of the lead, the welded portion 15 is preferably rectangular, as illustrated in FIG. 14(a).

Third Embodiment

The inventors of the present invention conducted keyhole joining between a lead 11 and a sealing plate 10 with a method according to the present invention, and studied the resultant joint structure, to find out the following phenomena.

As illustrated in FIG. 7(a), an end of the lead 11 (made of aluminium foil with a thickness of 0.15 mm and a width of 4 mm) extending from an electrode group was brought into contact with the sealing plate 10 (made of an aluminium plate with a thickness of 0.1 mm in a portion welded to the lead 11, and a diameter of 16.8 mm). In this state, the lead 11 was irradiated with a laser beam having a spot diameter of 0.02 mm and a power density of $7 \times 10^7$ W/cm$^2$, while being scanned along the width of the lead 11 at a scanning speed of 10 m/min. In this manner, laser welding was performed on the lead 11 and the sealing plate 10, and a joint structure of the resultant welded portion 15 was observed.

FIGS. 15(a)-15(d) show the results of the above-described process. Specifically, FIG. 15(a) is a graph showing a power profile of a laser beam 12, FIG. 15(b) is a plan view of the welded portion 15, FIG. 15(c) is a cross-sectional view of the welded portion 15, and FIG. 15(d) is a micrograph showing a plan view of the welded portion 15.

As illustrated in FIGS. 15(b) and 15(c), a welded portion 15a formed when scanning is started had a large penetration depth, whereas a welded portion 15b formed when the scanning is stopped had a recess 16 in the surface of the welded portion.

This phenomenon seems to be because of the following reasons. In application of a laser beam 12 with constant power, the amount of heat input per a unit area was large until the scanning speed reaches a predetermined value. In addition, a rapid temperature rise in an irradiated portion of the lead 11 increased the penetration depth. When the scanning was stopped, the amount of heat input per a unit area increased as the scanning speed decreased, thereby forming the recess 16.

In a laser welding process providing such a joint structure, the melt state of the lead 11 (and the sealing plate 10) is unstable, and thus melted metal might be partially sputtered. In addition, when a positional shift occurs in adjusting the scanning path of the laser beam 12 to cause the scanning start/end point to reach a region where the lead 11 does not exist, the laser beam 12 is applied directly to the surface of the sealing plate 10, resulting in that the sealing plate 10 might be perforated.

In this embodiment, in order to reduce formation of such an unstable joint structure, a technique for achieving stable through-hole welding by reducing the influence of sputtering during laser welding between the lead and the sealing plate, is proposed.

FIGS. 16(a)-16(d) schematically illustrate a process of laser-welding the lead 11 to the sealing plate 10 according to this embodiment. Specifically, FIG. 16(a) is a graph showing a power profile of the laser beam 12, FIG. 16(b) is a plan view of the welded portion 15, the FIG. 16(c) is a cross-sectional view of the welded portion 15, and FIG. 16(d) is a micrograph showing a plan view of the welded portion 15.

In a manner similar to the method shown in FIG. 7(a), the lead 11 extending from the electrode group and being in contact with the sealing plate 10 at one end is irradiated with a laser beam having a spot diameter smaller than the thickness of the lead 11, while being scanned along the width of the lead 11, thereby laser-welding the end of the lead 11 to the sealing plate 10. In this manner, a linear welded portion 15 is formed.

At this time, as shown in FIG. 16(a), laser irradiation is performed in such a manner that the power of the laser beam 12 is increased for a period (from time 0 to time $t_1$) after the start of scanning, and is reduced for a period (from time $t_2$ to time $t_3$). Accordingly, stable through-hole welding can be performed. Thus, as illustrated in FIGS. 16(b) and 16(c), a joint structure with a substantially constant penetration depth of the welded portion 15 can be obtained without formation of a recess.

FIG. 16(d) is a micrograph showing a plan view of the welded portion 15 obtained by bringing an end of the lead 11 made of aluminium foil with a thickness of 0.15 mm and a width of 4 mm into contact with the sealing plate 10 made of an aluminium plate with a thickness of 0.1 mm (in a portion welded to the lead 11) and a diameter of 16.8 mm, and irradiating the lead 11 with a laser beam having a spot diameter of 0.02 mm and a power density of $7 \times 10^7$ W/cm$^2$, while scanning the lead 11 at a scanning speed of 10 m/min so as to laser-welding the lead 11 to the sealing plate 10. The laser irradiation was performed for 18 msec. in such a manner that the power density of the laser beam 12 was increased for 3 msec. after the start of the scanning, and is reduced for 3 msec. before the stop of the scanning. During this irradiation, no sputtering was observed.

The laser irradiation is preferably performed with the power of the laser beam 12 kept constant in an interval after a lapse of a period after the start of the scanning and before a period before the stop of the scanning (i.e., time $t_1$ to time $t_2$). Alternatively, the power of the laser beam 12 may be changed within a range in which the melting state does not rapidly change as long as a sufficient joint strength is ensured.

The laser irradiation of this embodiment may employ fiber laser scanning illustrated in FIG. 8. The scanning speed and the scanning direction of the laser beam 12 are controlled by the galvano scanner 33. The power density of the laser beam 12 is synchronized to scanning with the laser beam 12 to show a power profile as shown in FIG. 16A. The power profile of the laser beam 12 may be substantially controlled by moving the focal point of the laser beam 12 along the surface of the lead 11.

It should be recognized that the foregoing embodiments are only preferred examples of the present invention, and should not be taken as limiting the scope of the present invention, and various changes and modifications may be made. For example, in the above embodiments, the lead 11 and the sealing plate 10 are made of the same aluminium material. Alternatively, the lead 11 and the sealing plate 10 may be made of different types of metal. To seal the opening of the battery case 5, the sealing plate 10 to which the lead 11 is welded is not necessarily crimped onto the opening of the battery case 5, and may be welded to the opening of the battery case 5.

In the above embodiments, after the electrode group 4 from which the lead 11 extends has been housed in the battery case 5, the lead 11 is laser-welded to the sealing plate 10. Alternatively, the lead 11 may be laser-welded to the sealing plate 10 before the electrode group 4 in which the lead 11 is welded to the sealing plate 10 is housed in the battery case 5. In this case, after housing the electrode group 4 in the battery case 5, the opening of the battery case 5 is sealed with the sealing plate 10.

The type of a sealed secondary battery according to the present invention is not specifically limited, and the present invention is also applicable not only to lithium-ion secondary batteries, but also to nickel-metal hydride storage batteries. Further, the present invention is applicable not only to cylindrical secondary batteries, but also to rectangular secondary batteries. The electrode group is not necessary formed by winding a positive electrode plate and a negative electrode plate with a separator interposed therebetween, and may be formed by stacking a positive electrode plate, a negative electrode plate, and a separator.

INDUSTRIAL APPLICABILITY

The present invention can provide a stable, reliable sealed secondary battery, and is useful for power sources for driving, for example, mobile equipment.

DESCRIPTION OF REFERENCE CHARACTERS 1 positive electrode plate
2 negative electrode plate
3 separator
4 electrode group
5 battery case
6 gasket
10 sealing plate
11 lead
11a region
12 laser beam
13 melted portion
14 plasma
15 welded portion
20, 21 foreign substance
31 fiber
32 collimator lens
33 galvano scanner
35 gas supply nozzle
100 plate member
101 laser beam
102 keyhole
103 melted region

The invention claimed is:

1. A sealed secondary battery in which an electrode group formed by stacking or winding a positive electrode plate and a negative electrode plate with a separator interposed therebetween is housed in a battery case, and an opening of the battery case is sealed with a sealing plate, wherein
   a lead extending from one of the positive and negative electrode plates in the electrode group is welded to the sealing plate by keyhole welding with application of a fiber laser beam having a spot diameter smaller than a thickness of the lead.

2. The sealed secondary battery of claim 1, wherein a welded portion formed by parts of the lead and the sealing plate has a penetration depth greater than a bead diameter of the welded portion.

3. The sealed secondary battery of claim 1, wherein a welded portion formed by parts of the lead and the sealing plate has a linear shape.

4. The sealed secondary battery of claim 1, wherein each of the lead and the sealing plate contains aluminium as a main component.

5. The sealed secondary battery of claim 1, wherein the spot diameter of the laser beam is less than or equal to ½ of the thickness of the lead.

6. The sealed secondary battery of claim 3, wherein the welded portion has at least two separate linear or curved portions.

7. The sealed secondary battery of claim 3, wherein the welded portion forms one of a continuous closed line and a continuous closed curve.

8. The sealed secondary battery of claim 3, wherein the welded portion has a continuous zigzag pattern.

9. The sealed secondary battery of claim 3, wherein the welded portion has at least a linear portion extending perpendicularly to a longitudinal direction of the lead.

10. The sealed secondary battery of claim 3, wherein a ratio of a welding length to a welding width in the welded portion is at least four.

11. The sealed secondary battery of claim 3, wherein the welded portion is formed along a width of the lead, and
a welding length of the welded portion is at least 1/3 of the width of the lead.

12. A method for fabricating a sealed secondary battery of claim 1, the method comprising the steps of
(a) preparing an electrode group formed by stacking or winding a positive electrode plate and a negative electrode plate with a separator interposed therebetween;
(b) connecting one end of a lead to one of the positive and negative electrode plates in the electrode group;
(c) housing the electrode group in a battery case;
(d) applying, to the lead, a fiber laser beam having a spot diameter smaller than a thickness of the lead, with another end of the lead brought into contact with a sealing plate, thereby welding the another end of the lead to the sealing plate by keyhole welding; and
(e) sealing an opening of the battery case with the sealing plate.

13. The method of claim 12, wherein in step (d), the lead is irradiated with the laser beam, while being continuously scanned with a fiber laser.

14. The method of claim 13, wherein the laser beam is applied in such a manner that power of the laser beam is increased for a period after start of the scanning and is reduced for a period before stop of the scanning.

15. The method of claim 14, wherein the laser beam is applied in such a manner that power of the laser beam is kept constant in an interval after a lapse of the period after the start of the scanning and before the period before the stop of the scanning.

16. The method of claim 14, wherein a welded portion formed by parts of the lead and the sealing plate has a uniform penetration depth along a direction of the scanning with the laser beam.

17. The method of claim 14, wherein a welded portion formed by parts of the lead and the sealing plate has a linear shape.

18. The method of claim 14, wherein the increase and the reduction of the power of the laser beam are performed with a focal point of the laser beam moved relative to a surface of the lead.

19. The method of claim 12, wherein in step (d), the laser beam has a spot, diameter less than or equal to 1/2 of a thickness of the lead.

20. The method of claim 12, wherein each of the lead and the sealing plate contains aluminium as a main component.

* * * * *